(12) United States Patent
Braun

(10) Patent No.: US 11,254,237 B2
(45) Date of Patent: Feb. 22, 2022

(54) METHOD AND SYSTEM FOR OPERATING A FUEL CELL SYSTEM

(71) Applicant: Robert Bosch GmbH, Stuttgart (DE)

(72) Inventor: Jochen Braun, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 16/610,425

(22) PCT Filed: Mar. 14, 2018

(86) PCT No.: PCT/EP2018/056355
§ 371 (c)(1),
(2) Date: Nov. 1, 2019

(87) PCT Pub. No.: WO2018/202348
PCT Pub. Date: Nov. 8, 2018

(65) Prior Publication Data
US 2021/0162885 A1 Jun. 3, 2021

(30) Foreign Application Priority Data
May 4, 2017 (DE) .................... 10 2017 207 477.9

(51) Int. Cl.
*B60L 58/31* (2019.01)
*H01M 8/04303* (2016.01)
(Continued)

(52) U.S. Cl.
CPC .............. *B60L 58/31* (2019.02); *B60L 58/12* (2019.02); *B60L 58/40* (2019.02);
(Continued)

(58) Field of Classification Search
CPC .......... B60L 2240/547; B60L 2240/60; B60L 2260/22; B60L 2260/46; B60L 2260/58;
(Continued)

(56) References Cited

U.S. PATENT DOCUMENTS

| | | | |
|---|---|---|---|
| 2003/0044658 A1* | 3/2003 | Hochgraf | H01M 8/04626 320/101 |
| 2011/0003215 A1* | 1/2011 | Tanaka | H01M 8/04761 429/413 |
| 2013/0034787 A1* | 2/2013 | Miyata | H01M 8/04447 429/429 |

FOREIGN PATENT DOCUMENTS

| | | |
|---|---|---|
| DE | 112007002603 | 12/2009 |
| DE | 112010005520 | 2/2013 |

(Continued)

OTHER PUBLICATIONS

International Search Report for Application No. PCT/EP2018/056355 dated May 30, 2018 (English Translation, 3 pages).

*Primary Examiner* — Adam A Arciero
(74) *Attorney, Agent, or Firm* — Michael Best & Friedrich LLP

(57) ABSTRACT

The invention relates to a method and to a system for operating a fuel cell system (22) and at least one sub-system (30) of the fuel cell system (22). According to the invention, these are arranged in a vehicle (10), wherein the energy for a drive train (12) of the vehicle (10) can be drawn both from the fuel cell system (22) and from an alternative energy store (26). The method comprises the following method steps: first, the number and duration of shut-down and/or stop phases of the vehicles (10) in a defined time interval in a first vehicle state (86) or in a second vehicle state (88) is determined based on vehicle state-specific learning functions (90, 112). Operating parameters of the fuel cell system (22) and of the at least one sub-system (30) of the fuel cell system (22) are then adjusted in dependence on the determined number and duration of shut-down and/or stop phases of the vehicle (10).

17 Claims, 2 Drawing Sheets

Figure 1:
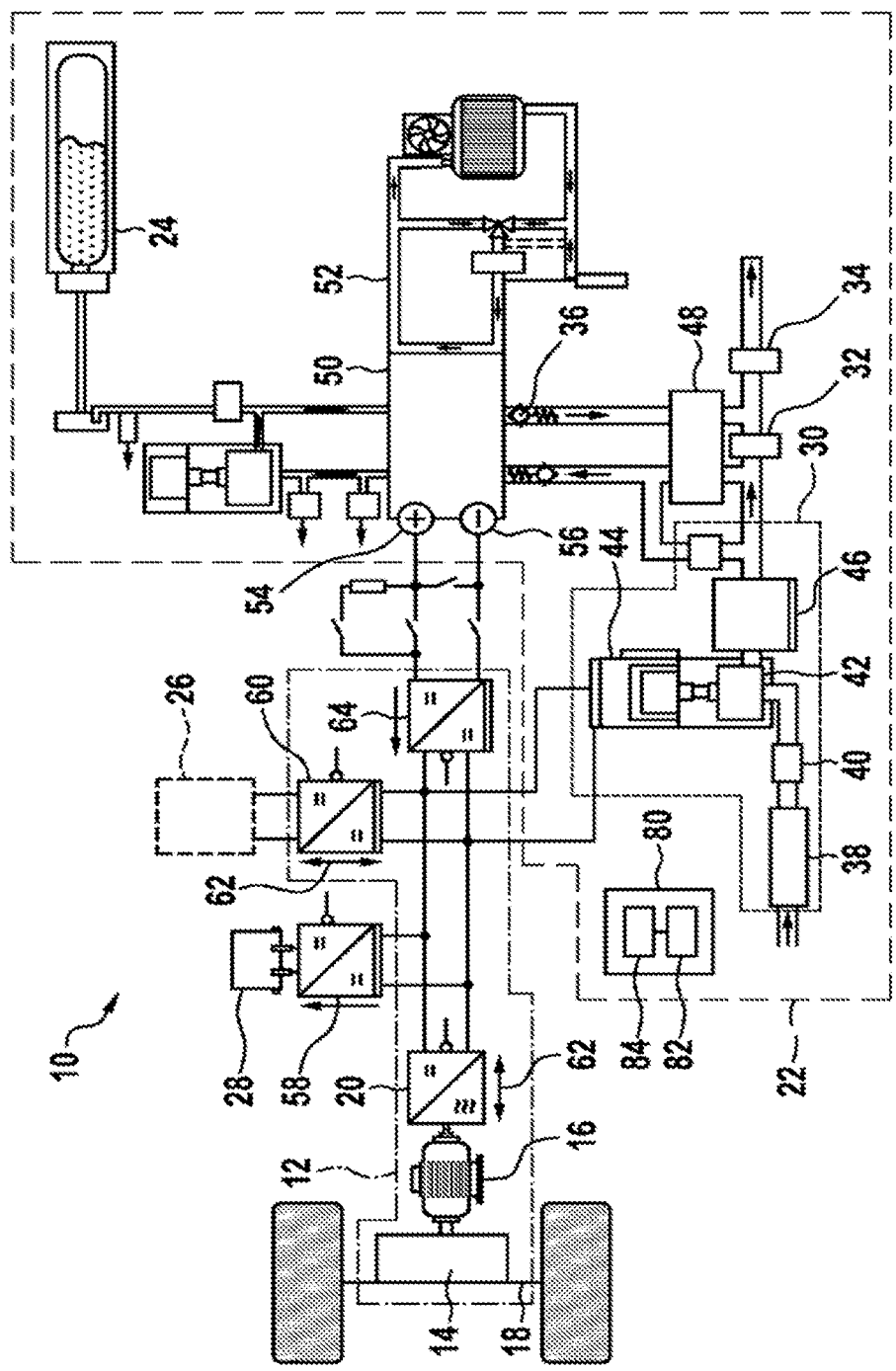

(51) Int. Cl.
*B60L 58/12* (2019.01)
*B60L 58/40* (2019.01)
*H01M 8/04082* (2016.01)
*H01M 16/00* (2006.01)

(52) U.S. Cl.
CPC ... *H01M 8/04201* (2013.01); *H01M 8/04303* (2016.02); *H01M 16/003* (2013.01); *B60L 2240/547* (2013.01); *B60L 2240/60* (2013.01); *B60L 2260/46* (2013.01); *H01M 2250/20* (2013.01)

(58) Field of Classification Search
CPC .......... B60L 58/12; B60L 58/30; B60L 58/31; B60L 58/40; H01M 16/003; H01M 16/006; H01M 2250/20; H01M 8/04089; H01M 8/04201; H01M 8/04303
See application file for complete search history.

(56) References Cited

FOREIGN PATENT DOCUMENTS

| | | |
|---|---|---|
| DE | 102012203219 | 9/2013 |
| DE | 102012224450 | 3/2014 |
| EP | 1086847 | 3/2001 |
| WO | 2014017496 A1 | 1/2014 |

\* cited by examiner

METHOD AND SYSTEM FOR OPERATING A FUEL CELL SYSTEM

BACKGROUND OF THE INVENTION

The invention relates to a method and a system for operating a fuel cell system, which is arranged within a vehicle, wherein the energy for a drive train of the vehicle can be taken from both the fuel cell system as well as from the alternative energy store.

In the case of vehicles with drive systems with fuel cell systems (also referred to as FCSs), when shutting down the vehicle, a shutdown procedure for the fuel cell system is carried out.

SUMMARY OF THE INVENTION

In the case of a method according to the invention for operating a fuel cell system, which is arranged within a vehicle, wherein the energy for a drive train of the vehicle can be taken both from the fuel cell system, as well as from the alternative energy store, it is provided that a determination of the number and duration of the intervals of the start and/or stop phases of the vehicle is carried out at a defined time interval in a first vehicle state or in a second vehicle state based on state-specific learning functions. Operating parameters of the fuel cell system and of the at least one subsystem of the fuel cell system are then adjusted depending on the previously determined number and duration of shutdown and/or stop phases of the vehicle and then, optionally, an adaptation of the state of charge (SOC) of the alternative energy store takes place. Due to the proposed solution according to the invention, the possibility exists to take the operating mode of the vehicle into account with regard to both the destinations having been traveled to as well as future destinations. For this purpose, learning functions are implemented that delay the shutdown of the fuel cell system and the shutdown of the air conveyance subsystem, i.e. making extra running time of these systems possible. An additional delay of the extra running time of the air conveyance subsystem by a further activation of this system without a load, i.e. almost pressureless with a fully opened pressure control valve, is possible, wherein the minimum air-mass flow is implemented by completely opening a bypass valve and the minimum air-mass flow is not guided through the fuel cell stack itself but past it. Optionally, special peculiarities of the current driving route can be taken into consideration via navigation systems, and also the ambient temperature as well as other operating parameters.

The vehicle comprises a hybrid energy source with regard to the energy for the electric drive of the motor vehicle. The energy for the electric drive can originate both from the fuel cell system as well as from the alternative energy store. For example, the electric drive comprises an electrical drive train (powertrain) with an electric machine, power electronics and a gearbox. The motor vehicle is preferably an electric vehicle (also referred to as EV) with a fuel cell system. As an alternative to this, the motor vehicle can also be a hybrid vehicle or a plug-in hybrid vehicle with a fuel cell system. In addition to a drive of an axle, another drive can still be installed, for example, a two-axle drive for four-wheel drive. In particular, for example, one electric drive with an electric machine, power electronics and a gearbox can be provided at each axle. Both electric drives can be coupled to the fuel cell system and the alternative energy store. There can also be other combinations so that, for example, an electric machine is powered from the battery and is recuperated into the battery. Other variants are also possible here, such as a wheel hub drive.

The alternative energy store of the vehicle can, for example, be a traction battery or also another energy store with an energy converter. By the term "battery", in the present disclosure, an accumulator system is also understood as is common within the scope of language usage. In the following, the terms "battery" and "electrical energy store" will be used synonymously to a great extent for the sake of simplicity. Preferably, the alternative energy store comprises a traction battery or a supercapacitor (also referred to as a supercap or an SC). The alternative energy store can also be used for the recovery of brake energy in the vehicle.

The fuel cell system comprises an energy store, for example, an $H_2$ tank, with an electrochemical energy converter. The electrochemical energy converter alone (without an $H_2$ tank) can also be referred to as a fuel cell system. The fuel cell system typically comprises galvanic cells, which convert the chemical reaction energy of a supplied fuel and an oxidant into electrical energy. The fuel cell system can, for example, be a hydrogen-oxygen fuel cell system, but also based on ethanol, methanol or other hydrocarbons. In particular, the fuel cell system can comprise PEMFC membrane technology (proton exchange membrane) or solid oxide fuel cells (SOFC's).

The method according to the invention can, for example, be used in the case of fuel cell systems where the shutdown procedure involves a drying of a cathode path of the fuel cell system. The cathode path, in particular with the stack, is blown dry by an air conveyance unit to avoid freezing remaining water or water vapor in the cathode path and in the sensor system.

The shutdown procedure of the fuel cell system comprises, for example, the following steps, wherein subsequently listed subsystems are shutdown, wherein the manner and the temporal sequence depends on the respective topology of the fuel cell system:

air system: after optional dehumidification/drying of the cathode path by means of an air conveying unit: stopping the air supply, wherein the oxygen then reacts in remaining volume within a few minutes and seconds, shutting down the $H_2$ supply (e.g. valves), pumping the $H_2$ supply unit so that the anode path is then also blocked off, shutting down the cooling system, depending on the temperature, wherein this can be coupled to the air and $H_2$ control system, but does not necessarily have to be, shutting down the electrical system.

In particular, the method can be used in highly automated or fully automated vehicles, e.g. autonomous driving. The corresponding monitoring functions are carried out on an ongoing basis on an active level with sufficient accuracy and reliability. The method is in this case flexibly adapted to the respective system and component design by software parameters. In particular, the size of the battery or also the degree of hybridization is taken into consideration upon adjustment/application of the method and automatically adapted to the components (e.g. battery size) by the method. Monitoring is preferably carried out in time grids typical of vehicle control devices. A high sampling rate is not necessarily required so that there are no significant effects on the computing power or so that no special requirements have to be placed on the corresponding control device.

Furthermore, according to the invention, a system is proposed for operating a fuel cell system, which is arranged within a vehicle and is connected to an alternative energy store, wherein the energy for the drive train of the vehicle can be taken from the fuel cell system, as well as from the alternative energy store simultaneously or only from one of the sources. The system is designed and set up to carry out one of the previously described methods so that the features, which have been described with reference to the method, should accordingly apply to the system as disclosed or vice versa.

Preferably, the system is connected to a navigation system, via which a certain destination and the remaining distance to the destination are known. The modules can be designed as computer-implemented apparatuses and preferably comprise software components. The necessary computer code can be made available on any data carrier and can make a significant contribution to the implementation of the method.

According to the invention, a computer program is also proposed, in accordance with which one of the methods described herein is carried out if the computer program is run on a programmable computer device. The computer program comprises commands that cause one of the systems or subsystems described earlier to perform the appropriate steps of one of the methods previously described. For example, in the case of the computer program it can have to do with modules for implementing a control system for a fuel cell system and/or a battery management system of a vehicle. The invention also comprises a computer-readable medium, on which the computer program is stored. For example, the computer program can be stored on a permanent or rewritable storage medium, on a CD-ROM, DVD, Blu-ray disc, or a USB stick. In addition, or alternatively, the computer program can be made available for download on a computer device, such as a server or a cloud computing system, e.g. via a data network such as the Internet, or a communication connection such as a telephone line or a wireless connection.

According to the invention, a vehicle is also proposed which comprises a fuel cell system and an alternative energy store, wherein the energy for the drive of the vehicle is taken from the fuel cell system and from the alternative energy store simultaneously or only from one of the two sources. The vehicle also optionally comprises a navigation system or is connected to this so that a specific destination and the remaining distance to the destination are known. According to a preferred embodiment, the alternative energy store comprises one or a plurality of traction batteries and/or supercapacitors.

By means of the solution proposed according to the invention, the number of start/stop operations for a vehicle with a fuel cell system and its subsystems can be significantly reduced. The resulting advantages include the fact that the load profile, which is set for the actuators within a fuel cell system, and especially also the actuators in the air conveyance subsystem, can be minimized. This, in turn, improves the wear and aging process of the components used as well as maintenance intervals. There is a reduction in the probability of failure of the components, which achieves a more robust operation of the fuel cell system and its air conveyance subsystem. When designing the actuators installed within these systems, reductions in the load profiles can be used so that the components can be designed more cost-effectively.

In particular, the air conveyance subsystem is significantly relieved on a mechanical level in the solution proposed according to the invention by minimizing the start and stop operations. Due to the high rotational speed occurring, the air conveyance subsystem comprises gas bearings, for which significantly reduced requirements can be placed when implementing the method proposed according to the invention. In these systems, start/stop operations represent very critical operating points, since the aerostatic pressure pad is no longer sufficient for gas bearings below a limit rotational speed to center a shaft in a contactless manner so that material friction can occur, which significantly affects wear. In the solution proposed according to the invention, this critical wear can be influenced in a particularly favorably manner by minimizing occurring start/stop operations or the use of gas bearings allowed in the first place. For other bearing types, a reduction in start/stop operations is also beneficial.

Due to a reduced control of the actuators installed in the fuel cell system and in the air conveyance subsystem, a reduced sound emission can be achieved or also an equalization of the sound emissions and thus, a less disturbing perception thereof. Furthermore, fewer system actions are required for the preparation and post-processing of a driving cycle, thereby resulting in a drastic reduction of an error potential due to fewer executed functions.

The method proposed according to the invention can be controlled autonomously by the vehicle and does not require any connection to, for example, a car-to-car infrastructure or a cloud connection or the like. By means of an integrating network, in particular using a navigation system, the proposed method according to the invention for minimizing start/stop operations can be optimized. The data required for the control can be stored/processed in control devices of the vehicle, meaning directly within the vehicle or also in the case of integrated network systems outside of the vehicle; one only need think of cloud connections.

Due to the proposed solution according to the invention, the use of gas bearings is only initially possible due to the reduction of the requirements, meaning the reduction of the number of start/stop operations since an excessively high number of required start/stop operations for a high-speed compressor or a high-speed turbomachine can represent a decisive criterion for implementation. The solution according to the invention also allows for an equalization of the sound emissions and thereby, less disturbing perception.

BRIEF DESCRIPTION OF THE INVENTION

Based on the figures, in the following, the method according to the invention and the system are described in more detail.

Figure 2:
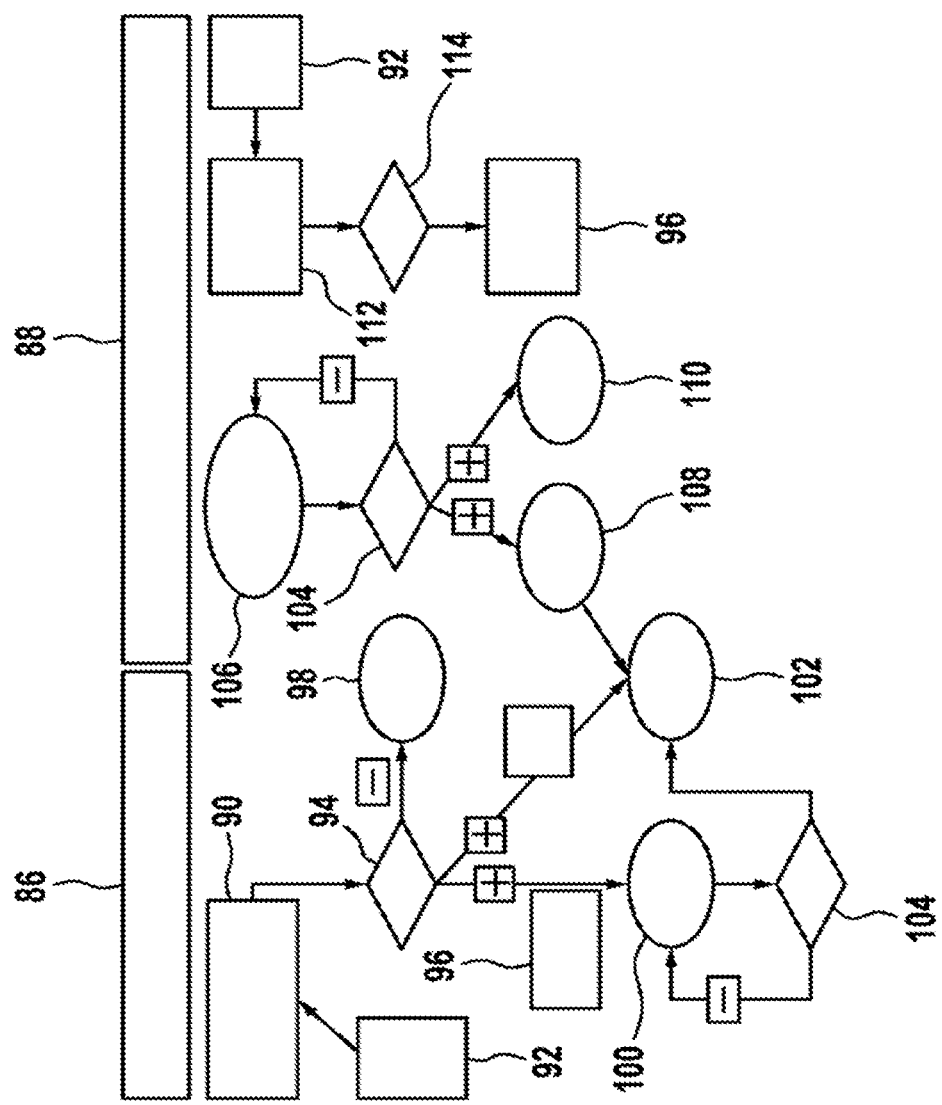

FIG. 1 shows an exemplary illustration of vehicle with a system according to the invention and FIG. 2 shows a schematic illustration of a method in accordance with an embodiment of the invention.

DETAILED DESCRIPTION

In the illustration in accordance with FIG. 1, only one possible topology of a fuel cell system 22 is shown with at least one alternative energy store 26 as an example for explaining the method. Here, it is explicitly pointed out that, in addition to the vehicle topology shown in FIG. 1, many other design possibilities of a fuel cell system 22 can be implemented with at least one alternative energy store 26.

FIG. 1 shows a vehicle 10 equipped with a fuel cell system 22 and at least one alternative energy store 26. The fuel cell system 22 and the alternative energy store 26 can make the full energy or a part of the energy available to a drive train 12 of the vehicle 10 respectively. Furthermore, the alternative energy store 26 can typically also recover energy. In addition to the drive train 12 of an axle 18, additional drive trains 12 can be installed for further axles of vehicle 10, which is not shown.

The fuel cell system 22 is connected to a control device 80, wherein this is equipped with known monitoring and diagnostic functions and, in particular, also set up to connect or disconnect the fuel cell system 22 to the drive train 12 of the vehicle 10, wherein the control device 80 can also trigger and carry out the shutdown procedure of the fuel cell system 22. In the control device 80, a first module 82 for performing a first learning function 90 and another second module 84 for performing a second learning function 112 are implemented (cf. FIG. 2).

The at least one alternative energy store 26, for example, a traction battery or a supercapacitor, is connected to another control device, wherein this is occupied with known monitoring and diagnostic functions and is also set up to connect or disconnect the alternative energy store 26 to the drive train 12 of the vehicle 10. The other control device can also be designed and designated as a battery management system. In principle, it is also conceivable to omit the other control device and also accommodate the control system, as well as the monitoring and diagnostic function for the at least one alternative energy store 26 within the control device 80.

FIG. 1 shows that the drive train 12 of the vehicle 10 comprises a gearbox 14 with at least one electric machine 16. The electric machine 16 is the drive for the driven axle 18. An inverter 20 is associated with the at least one electric machine 16; a bidirectionality should be indicated by means of position 62, meaning the at least one electric machine 16 works both in generator as well as in motor mode. The components of the drive train 12 of the vehicle 10 are marked in FIG. 1 by a dot/dashed line.

The vehicle 10 furthermore comprises the fuel cell system 22. This comprises at least one energy store 24, which is designed as an $H_2$ tank. The fuel cell system 22 furthermore comprises an air conveyance subsystem 30. In this, there is an air filter 38 and a downstream mass-flow sensor 40. The air conveyance subsystem 30 furthermore comprises a compressor 42, which is driven by a compressor drive 44 designed as an electric drive. Furthermore, an intermediate cooler 46 is arranged in the air conveyance subsystem 30, by means of which, after the compressor 42, the heated air is cooled again before it flows to a fuel cell stack 50 after passing through the intermediate cooler 46 of the fuel cell system 22. The fuel cell stack 50 is temperature controlled for its part by a cooling circuit 52, the components of which are only schematically indicated in the illustration in accordance with FIG. 1. On the output side, the fuel cell stack 50 comprises a plus pole 54 and a minus pole 56.

The inverter 20 of the drive train 12 is electrically connected to a fuel cell converter 64.

From the representation in accordance with FIG. 1, it is furthermore apparent that the vehicle 10 comprises at least one alternative energy store 26. The alternative energy store 26 can be designed as at least one high-voltage battery or as an arrangement of supercapacitors. As can be recognized from the illustration in accordance with FIG. 1, the alternative energy store 26 is electrically connected to both the drive train 12 as well as to the air conveyance subsystem 30 via a high-voltage converter 60. The high-voltage converter 60 is bidirectionally operable, indicated by reference number 62.

In addition, the vehicle 10 comprises a conventional 12-volt vehicle battery 28, which is connected to the drive train 12 of the vehicle 10 via a low-voltage converter 58.

It must be noted that the fuel cell system 22 in the design variant shown has a bypass valve 32, via which the air supplied by the air conveyance subsystem 30 can be guided past the fuel cell stack 50. In addition, there is a pressure control valve 34 in the fuel cell system 22 on the outflow side. On the input side, the fuel cell stack 50 is connected to a stop valve 36. Since the fuel cell system 22 designed with the topology shown in FIG. 1 has a bypass valve 32, another possibility for controlling and regulating the same is available. However, this is only a design option; the method proposed according to the invention is also applicable to a fuel cell system 22, which is designed without bypass valve 32.

While, in the illustration in accordance with FIG. 1, the components of the vehicle 10, in particular the components of the drive train 12, the ones of the fuel cell system 22, as well as those of the air conveyance subsystem 30, and furthermore, alternative energy stores 26 and more of the like are represented, based on the illustration of the flow chart in FIG. 2, the method proposed according to the invention for reducing the start/stop operations within the mobile fuel cell system 22 as well as of the at least one air conveyance subsystem 30 based on a vehicle "off" state (cf. position 86), as well as based on a vehicle "on" state (cf. position 88) is described in more detail.

As can be seen in the flow chart in accordance with FIG. 2, the operating mode of the vehicle 10 is taken under consideration for the past journeys and, if applicable, also with regard to other destinations by means of a first learning function 90. The first leaning function 90 in the first module 82 consequently delays the shutdown of the fuel cell system 22 and the shutdown of the air conveyance subsystem 30. The first learning function 90 determines the operating mode of the vehicle 10, above all, with regard to the shutdown/breaktimes between the individual journeys for as long until a restart of the vehicle 10 takes place. The first learning function 90 uses internal timers in the control devices 80 or also an integrated network data exchange 92, via which data from outside the vehicle 10, for example, via a navigation system or via a cloud, can be transferred to the first learning function 90 and taken into consideration in the determination of the operating mode of the vehicle 10. The corresponding data can be stored locally in EEPROM's or in the case of integrated network vehicles, exteriorly, for example in a cloud. The first leaning function 90 determines if the vehicle 10 stops very frequently, for example, within the minute range and then starts again, which is a typical operating mode for delivery vehicles, taxi operations and the like. In the following, this operating mode, which is characterized by frequent, short stops is referred to as the "delivery mode" 94. The first learning function 90 can evaluate the operating mode of the vehicle 10 both in shorter time frames, for example, in hours or days, as well as over longer periods, such as weeks and months.

The data ascertained within the first learning function 90 can then be used in order to adapt corresponding actions in the fuel cell system 22 and in the air conveyance subsystem 30 or in the case of additional consumer devices and in particular to adapt the state of charge (SOC) of at least one alternative energy store 26. If the vehicle 10 assumes a vehicle "on" state 88 (idling) in accordance with the illustration in FIG. 2, another second learning function 112 is used in the second module 84. The other second learning function 112 determines the operating mode of the vehicle 10 during a current driving cycle. The evaluation within the further, second learning function 112 can include the evaluation of a driving cycle as well as a plurality of driving cycles. The occurring start/stop phases of the vehicle 10 are determined, wherein the vehicle 10 is however not shut down. This results in information concerning the extent to which the vehicle 10 is traveling with frequent start/stop phases, for example in urban traffic, or whether this is less common in the operation of the vehicle 10.

In addition, the data ascertained within the scope of the other second learning function 112 are then used in order to instigate actions in the fuel cell system 22 in the air conveyance subsystem 30 and, if applicable, also with regard to the alternative energy store 26.

Starting from the vehicle "off" state (cf. position 86), in which the vehicle 10 is shut off, the first learning function 90 becomes active in order, if necessary, to take external data with regard to the determination of the operating mode of the vehicle 10 under consideration, thereby using an integrated network data exchange 92. If the determination results in that no "delivery mode" 94 is present, the call up of a standard shutdown routine 98 for the fuel cell system 22 of the vehicle 10 takes place.

If, on the other hand, the existence of the "delivery mode" 94 is detected in the first learning function 90, a plurality of options exist in the context of determining the operating mode of vehicle 10:

As a first action, the shutdown of the fuel cell system 22 can be delayed; this continues after the vehicle 10 has been parked for a certain period of time during the extra running time. The fuel cell system 22, like the air conveyance subsystem 30 as well, can be further operated when idling, thereby generating an electrical idling power. From the running time extension 100 of the fuel cell system 22, a branch-off to a state of charge query 104 can be carried out, within which, the state of charge (SOC) of the at least one alternative energy store 26 is queried. As long as the maximum of the SOCs has not been achieved, the electrical idling power, which is generated during the extra running time of the fuel cell system 22, can be fed into the alternative energy store 26 until this is full or almost full. Only then can auxiliary consumers 110 be switched on or, if the electrical idling power generated when the fuel cell system 22 is idling cannot be taken, a bleed-down action 108 takes place, within which the air conveyance subsystem 30 is shut down and remaining oxygen is consumed on the cathode side of the fuel cell stack 50.

If, the operating mode "delivery mode" 94 is detected within the scope of the first learning function 90 with regard to the operating mode of the vehicle state of the vehicle 10, a second action can be instigated, according to which a running time extension 102 of the air conveyance subsystem 30 is initiated. The air conveyance subsystem 30 is further operated here at minimum power with a minimum rotational speed. The minimum rotational speed is preferably just above the limit rotational speed for the gas bearings used. The limit rotational speed of the gas bearings used is determined by the formation of the aerostatic pressure pad in these, below which a shaft can no longer be centered in a contactless manner, i.e. solid-body contact occurs, which, however, must absolutely be avoided. During the extra running time of the air conveyance subsystem 30, the pressure control valve 34 shown in FIG. 1 is completely opened, so that an air conveyance is given at very low pressure and minimum load; furthermore, the bypass valve 32, (cf. the illustration of FIG. 1), is completely opened to guide the air-mass flow completely past the fuel cell stack 50. The air conveyance subsystem 30 can thus be further operated with a minimal level of power dissipation, which can be taken, for example, from the alternative energy store 26, for some time, in particular lying in the minute range, whereby the extra running time is also prolonged. With a minimum load, i.e. idling during the extra running time, the noise emissions of the components of the fuel cell system 22 or the components of the air conveyance subsystem 30 are also minimized.

In this context, it is noted that it is essential that the opening pressure of the stop valve 36, which is arranged on the inflow side in front of the fuel cell stack 50, is designed so that the opening pressure is slightly above the minimum pressure that is generated by the minimum air compression of the air conveyance subsystem 30. In any case, it must be ensured that no more air enters the fuel cell stack 50 in this operating state.

For systems without a bypass in the air path around the fuel cell stack 50, the air flow in idling mode must be led through the fuel cell stack 50. This is not optimal, but must be taken into consideration within certain limits in terms of water management, restarts and other conditions. The presence of a bypass is advantageous for the implementation of the method proposed according to the invention for reducing the start/stop operations, but not a mandatory condition for the proposed learning methods.

Starting from the vehicle "on" state (cf. position 88) (idling), in the other second learning function 112, the operating mode of the vehicle 10 during at least one driving cycle or also a plurality of driving cycles is determined with regard to occurring start/stop phases, wherein, however, the vehicle 10 is not shut down. Within the scope of the further second learning function 112, a stop-phase determination 114 is carried out. Analogously to the first learning function 90, the other second learning function 112 can also take into consideration data from a navigation system or, for example, a cloud during the determination of the operating mode of the vehicle 10 during its journey via an integrated data exchange 92. If it turns out that in the context of a stop-phase determination 114 stop phases frequently occur, for example, an adjustment of the range for the state of charge SOC of at least one alternative energy store 26 can be performed. The state-of-charge range for the at least one alternative energy store 26 can be somewhat lowered in the driving area so that the operation, meaning the extra running time of the fuel cell system 22, can be prolonged for a temporary shutdown phase.

If more frequent stop phases occur in the vehicle state 88, the fuel cell system 22 initially continues at the lowest level of load or idling when a stop phase occurs. The electrical idle power generated within the scope of the idling of the fuel cell system 22 can, to the extent possible, be fed into the at least one alternative energy store 26 as long as its state of charge (SOC) has not reached its maximum. If, on the other hand, the maximum state of charge SOC of at least one alternative energy store 26 is reached, either a bleed-down action 108, i.e. a shutdown of the air supply of the fuel cell system 22, can take place and remaining oxygen can react in the cathode. Alternatively, it is also possible to switch on additional consumer devices 110 in order to take away the electrical idle power generated during the extra running time 106 of the fuel cell system 22 during a stop phase of the vehicle 10.

While the extra running time 106 of the air conveyance subsystem 30 as described above represents a second option for action, a third option for action is to activate additional consumer devices 110. This is suitable, for example, if within the scope of the option for action 1, the state of charge SOC of the alternative energy store 26 has reached its maximum, thereby being fully or almost fully charged. It is then possible to switch on additional consumer devices 110, provided that these can be used in a useful way. For example, as part of switching on possible additional consumer devices 110, a charging of the conventional 12-volt vehicle battery 28 could be carried out, furthermore, actuator controls for plausibility and test functions could be carried out.

With this third action, switching on additional consumer devices 110, the extra running time phase of the fuel cell system 22 can be extended once again.

The other option for action is the idling operation of the air system via the bypass or through the fuel cell stack 50 in the case that that very bypass should not be present in a topology of the fuel cell system 22 without a bypass.

Within the scope of the integrated network data exchange 92, in the two learning functions described above 90 and 112 navigation data of a navigation system or navigation data of integrated network vehicles (car-to-car, car-to-infrastructure) can be correspondingly detailed and further optimized. For example, certain start/stop phases can already be included in the operational strategy for reducing start/stop operations in the forecast, such as emerging traffic congestion situations. The set destination, which is available in the context of the navigation data of a navigation system, can also be taken into account. If the target is achieved, the fuel cell system 22 or the air conveyance subsystem 30 can be completely shut down. If, on the contrary, the destination has not been reached, the extra running time phase of the fuel cell system 22 and/or the air conveyance subsystem 30 can be somewhat extended. When determining the operating strategy for the vehicle 10 with a mobile fuel cell system 22 and at least one alternative energy store 26, for example, other input parameters such as the ambient temperature, air humidity and more of the like can be taken under consideration. Furthermore, it must be mentioned that, for the case that the vehicle 10 is operated in the "delivery mode" 94, at low exterior temperatures, a part of the idling power generated when the fuel cell system 22 and the air conveyance subsystem 30 are idling can be used for heating the passenger compartment within the scope of a comfort function.

Alternatively, the functions can also be carried out outside of the vehicle 10 on a server and only the actuator control system and the sensor values can be exchanged via corresponding car-to-infrastructure interfaces.

The invention is not limited to the exemplary embodiments described herein and the aspects highlighted herein. Rather, within the range indicated by the claims, a large number of variations are possible, which are within the scope of professional action.

The invention claimed is:

1. A method for operating a fuel cell system (22) and at least one subsystem (30) of the fuel cell system (22), which are arranged in a vehicle (10), wherein energy for a drive train (12) of the vehicle (10) can be taken from both the fuel cell system (22) as well as from an alternative energy store (26), the method comprising:
   a) determining a number and duration of shutdown and/or stop phases of the vehicle (10) in a defined time interval in a first vehicle state (86) or in a second vehicle state (88) based on vehicle state-specific learning functions (90, 112);
   b) setting operating parameters of the fuel cell system (22) and of the at least one subsystem (30) of the fuel cell system (22) in dependence on the number and duration of shutdown and/or stop phases of the vehicle (10); and
   c) responsive to determining the number of shutdown phases exceeds a first threshold value within the defined time interval and an average duration of the shutdown phases exceeds a second threshold value, setting a first and second operating state of the fuel cell system (22).

2. The method as claimed in claim 1, wherein, in addition to the method steps a) and b) an adaptation (96) of a state-of-charge range (SOC) of the alternative energy store (26) is performed.

3. The method as claimed in claim 2, wherein the adaptation of the state-of-charge range of the alternative energy store (26) comprises an adaptation of a min-max limit and/or and adaptation of a control/regulation of the state of charge.

4. The method as claimed in claim 1, wherein in the first learning function (90) associated with the first vehicle state (86), the operating mode of the vehicle 10 with regard to the shutoff and/or stop phases of the vehicle (10) between individual journeys up until restarting is carried out, for the sake of which, internal timers on control devices (80), an integrated network data exchange (92), a data storage on a local EEPROM as well as an evaluation of the operating mode in hours and/or days and/or longer time periods are carried out.

5. The method as claimed in claim 1, wherein, in a second learning function (112) associated with the second vehicle state (88), the operating mode of the vehicle (10) is determined during at least one driving cycle in the case of a vehicle (10) that is not shut down with regard to occurring start/stop phases.

6. The method as claimed in claim 1, wherein the first learning function (90) and/or the second learning function (112) take a current driving route of the vehicle (10) into account.

7. The method as claimed in claim 1, wherein the first learning function (90) and/or the second learning function (112) take into account the ambient temperature and at least one other operating parameter selected from the group consisting of current consumer devices within the on-board network, humidity of the ambient air, aging process of the battery, aging process of the fuel cell stack (50), and condition of the vehicle air-conditioning.

8. The method as claimed in claim 1, wherein the first operating state of the fuel cell system (22) comprises a delayed shutdown of the fuel cell system (22), within which the fuel cell system (22) is operated in idling mode and resulting energy is stored in the alternative energy store (26) and/or transferred to additional consumer devices (110).

9. The method as claimed in claim 1, wherein, when the determined number of stop phases exceeds a third threshold value within the defined time interval and an average duration of the stop phases exceeds a fourth threshold value, a second or a third operating state of the fuel cell system (22) is set.

10. The method as claimed in claim 1, wherein the second operating state of the fuel cell system (22) entails operating the air conveyance subsystem (30) of the fuel cell system (22) at a minimum load and a minimum rotational speed.

11. The method as claimed in claim 9, wherein the second operating state of the fuel cell system (22) comprises conducting of an air-mass flow by means of an open bypass valve (32) past the fuel cell stack (50) of the fuel cell system (22).

12. The method as claimed in claim 9, wherein, in a third operating state of the fuel cell system (22), switching on additional consumer devices (110) takes place for the case that the SOC of the alternative energy store (26) has reached its maximum.

13. A non-transitory computer-readable medium for operating a fuel cell system (22) and at least one subsystem (30) of the fuel cell system (22), which are arranged in a vehicle (10), wherein energy for a drive train (12) of the vehicle (10) can be taken from both the fuel cell system (22) as well as from an alternative energy store (26), the computer-readable medium containing computer-executable instructions that when executed by a computer device cause the computer device to:
- determine a number and duration of shutdown and/or stop phases of the vehicle (10) in a defined time interval in a first vehicle state (86) or in a second vehicle state (88) based on vehicle state-specific learning functions (90, 112);
- set operating parameters of the fuel cell system (22) and of the at least one subsystem (30) of the fuel cell system (22) in dependence on the determined number and duration of shutdown and/or stop phases of the vehicle (10); and
- responsive to determining the number of shutdown phases exceeds a first threshold value within the defined time interval and an average duration of the shutdown phases exceeds a second threshold value, set a first and second operating state of the fuel cell system (22).

14. A system for operating a fuel cell system (22), which is arranged in a vehicle (1), wherein energy for a drive train (12) of the vehicle (10) can be taken from the fuel cell system (22) or from an alternative energy store (26), wherein this comprises a first module (82) for carrying out a first learning function (90) and a second module (84) for carrying out a second learning function (112), in which the operating mode of the vehicle (10) is determined with regard to shutdown/break times between individual journeys up until restarting or the operating mode of the vehicle (10) during a driving cycle with regard to occurring start/stop phases,
- wherein the fuel cell system (22) comprises: a fuel cell stack (50) and at least one air conveyance subsystem (30), where a pressure control valve (34) for air conveyance at a pressure subjected to minimum load and a bypass valve (32) are completely open in order to lead an air-mass flow occurring at minimum load of the air conveyance subsystem (30) past the fuel cell stack (50).

15. The system for operating a fuel cell system (22) as claimed in claim 14, wherein a stop valve (36) is arranged in front of the fuel cell stack (50), an opening pressure of which is over a minimum pressure, which is generated by the air conveyance subsystem (30) via a minimum air compression.

16. The system as claimed in claim 15 connected to a navigation system, via which a certain destination and a remaining distance to the destination are known.

17. A vehicle (10) with a system as claimed in claim 14, wherein the alternative energy store (26) comprises one or a plurality of traction batteries, supercapacitors, or both.

* * * * *